March 28, 1967     G. H. YOUNG     3,310,883
TRAINER Filed Feb. 11, 1964     6 Sheets-Sheet 1

INVENTOR
GEORGE H. YOUNG
BY
ATTORNEY

March 28, 1967  G. H. YOUNG  3,310,883
TRAINER
Filed Feb. 11, 1964  6 Sheets-Sheet 2

INVENTOR
GEORGE H. YOUNG
BY Raymond W. Colter
ATTORNEY

United States Patent Office 3,310,883
Patented Mar. 28, 1967

3,310,883
TRAINER
George H. Young, Sicklerville, N.J., assignor to North American Electronic Systems, Inc., a corporation of Pennsylvania
Filed Feb. 11, 1964, Ser. No. 344,060
18 Claims. (Cl. 35—10)

This invention relates to a trainer for familiarizing students with the operation testing and maintenance of various types of equipment.

Trainers embodying the present invention are adapted to simulate the presence of selected malfunctions in any of an almost infinite number of types of equipment, rendering such trainers extremely useful, versatile and economical in conjunction with operations where training requirements are varied.

These trainers display immediately the performance of a trainee by displaying the simulated results of his test point checks and simulated component replacements, thereby reinforcing the learning process. At the same time, the trainer presents to the trainee a simulated system in such a dynamic schematic form as to expedite his comprehension of the interaction of the components making up the system.

Each trainer, according to this invention, includes a basic assembly providing a student panel adapted to portray a system undergoing study, an instructor panel providing means for the selective insertion of simulated malfunctions into such system, scoring devices for indicating the proficiency of the student, and common circuitry designed to serve all of the uses for which the trainer is intended. In order to employ the basic assembly to simulate a particular piece of equipment, plug boards provided with prewired circuits corresponding to such equipment are connected to the common circuitry by means of complementary plugs and sockets, and an overlay or template portraying this equipment is disposed on the student panel.

The student panel is provided with actuators and indicators, sometimes referred to as actuator-indicators, identified by the portrayal appearing on each overlay, permitting the student to ascertain the presence of any malfunction in the simulated equipment, correct it, and observe the operating conditions in various portions of the simulated equipment at any time.

Accordingly, it is an object of the present invention to provide a trainer comprising a panel, a plurality of switch actuators and visually changeable indicators carried by the panel, a changeable template containing openings registering with certain of the actuators and indicators, the template bearing a portrayal of an operating system and bearing indicia identifying the actuators and indicators with respect to components and functions of the system portrayed; electric switches and lamps associated with the actuators and indicators and having terminals; a plurality of gating units having circuits adapted for selective connection with the terminals; and readily changeable plug board means providing circuitry interconnecting certain of the circuits with certain of the terminals in correspondence with the operating system portrayed by the template.

It is contemplated that the trainer comprise: switches connected by the circuitry with the gating units controlling the operation of the gating units; switching means connected by the circuitry for modifying the operation of certain of the gating units to simulate a malfunction in the portrayed operating system; an AND gate and an OR gate in each gating unit, each having a plurality of input terminals; means for detachably mounting the template and plug board means to facilitate their replacement; scoring means connected with the circuitry for indicating proficiency of a user, including one or more devices for indicating the number of tests performed, the number of corrective measures attempted, and elapsed time; and display means connected by the circuitry with certain of the gating units to represent simulated conditions existing in the portrayed operating system.

The template preferably identifies a plurality of test points for the portrayed operating system and the display means preferably represents simulated conditions existing at the test points, by means of suitable projection systems utilizing changeable transparencies which are keyed to the various templates and plug board means respectively, certain of the gating units controlling the selection of the transparencies to be displayed.

The display means preferably depicts instrument indications of simulated conditions existing at selected test points of the operating system undergoing study and the panel preferably includes an actuator for simulating replacement of a component of the system as may be necessary to overcome a malfunction caused by such component or combination of components.

A more complete understanding of the invention will follow from a description of the accompanying drawings wherein.

A trainer 20 of the type contemplated by the present invention comprises a panel 22, a plurality of switch actuators and visually changeable indicators 24, frequently referred to herein as actuator-indicators, a changeable template 26 containing openings 28 registering with certain of the actuators and indicators, the template bearing a portrayal 30 of an operating system and bearing indicia 32 identifying the actuators and indicators 24 with respect to components and functions of the system. Associated with the actuator-indicators 24 are electric switches designated as SW or S and lamps designated L, having terminals 34 adapted for connection with corresponding terminals 36 carried by changeable plug boards 38 whose conductors are represented by broken lines in the diagrams of FIGS. 4A, 4B, 5A and 5B. Plug boards or patch boards for the purposes of this invention are commercially available from AMP, Incorporated, Harrisburg, Pa., depicted in the manufacturer's catalog, by drawing No. 695,422, and the cooperating terminal board 39 by drawing No. 695,423. The trainer incorporates a plurality of gating circuits 40 of the types depicted in FIGS. 6 and 7, a plurality of mixer circuits 42 of the types depicted in FIGS. 8 and 9, and a plurality of driver circuits 44 of the types depicted in FIGS. 10, 11 and 12.

Figure 2:
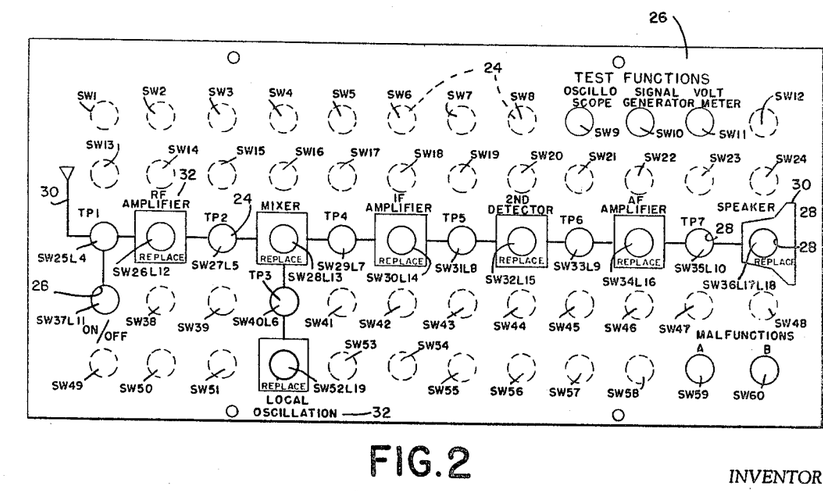
FIG. 2 is a plan view of the template depicted in FIG. 1 bearing a block diagram of a radio receiver and overlying a portion of the trainer panel.

Each of the switch actuators and visually changeable indicators 24 illustrated in the drawings contemplates a light transmitting push button whose depression by the student will operate its respective switch SW or S and through which the light produced by its respective lamp or lamps L can be perceived. As shown in FIG. 2 of the drawings, for example, the template 26 will expose certain of the actuator-indicators 24 through its openings 28, and obscure the remaining ones which have been indicated by broken lines. Actuator-indicators suitable for use in conjunction with the present invention are manufactured by Controls Company of America, Control Switch Division, Folcroft, Pa., model No. C 41-0-123WWW-2, Catalog No. 120 and by O & S Research, Inc., Riverton, N.J., drawing No. H0100-3, dated Apr. 11, 1961, and are available for purchase as standard components. The actuator-indicators 24 have been identified in the drawings by the switches and/or lamps with which they are associated by the circuits established by the plug boards corresponding to the various templates. In the radio receiver represented by the template of FIG. 2 and the related diagrams of FIGS. 4A and 4B each visible actuator-indicator 24 is designated by the letters SW followed by a numeral designating a particular switch and by the letter L followed by a numeral designating a particular lamp or lamps. In this manner the corresponding components can be recognized readily in the related figures. Where the actuator-indicators 24 are obscured by a template, they are shown in broken lines and designated with respect to switch (SW) designations only. With respect to the reference characters SW59 and SW60 in these figures, they represent actuators which require no indicating functions, since one or both of these elements will be depressed by an instructor to insert a simulated malfunction in the portrayed system for the student to locate and overcome.

Instead of locating the actuators for the malfunction switches on the panel as depicted in FIG. 2, the trainer contemplated herein may be provided with an instructor console 46 equipped with any desired number of actuators 48 which can be operated by the instructor to introduce one or more malfunctions into the simulated system portrayed by the template.

Figure 1:
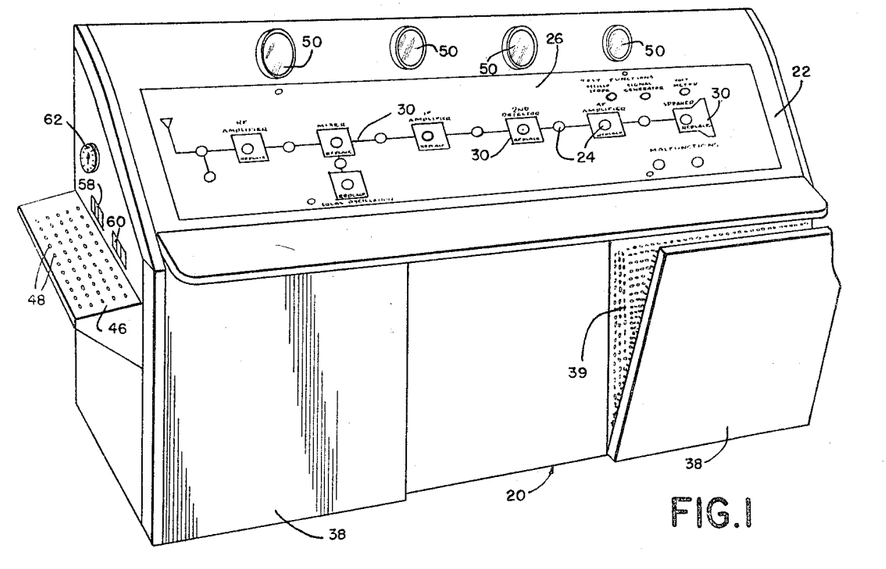
FIG. 1 is a perspective view of one form of trainer contemplated by the present invention.

The block diagram of the radio receiver portrayed by the template 26 shown in FIGS. 1 and 2, proceeding from left to right depicts an antenna supplying a signal to a radio frequency amplifier whose output and the output of an oscillator are fed to a mixer whose output supplies an intermediate frequency amplifier having an output supplying a second detector whose output signal is fed to an audio frequency amplifier having an output supplying a speaker. By depressing the actuator-indicator 24 adjacent the word "REPLACE" adjacent any of the components, the student will simulate the substitution of a new and operative component. In the event the component replaced possessed a malfunction, such replacement would enhance the score of the student. On the other hand, if the component replaced contained no malfunction, the replacement would detract from the score attained by the student, in a manner to be explained hereinafter. To enable the student to test any portion of the simulated system, certain of the actuator-indicators 24 are designated on the template by the letters TP followed by a numeral to identify a number of test points. By depressing the button at TP1 and the buttons designated SW9 a simulated oscilloscope representation of the incoming signal applied to the R.F. amplifier will be projected on one of a plurality of projection screens 50. Similarly by depressing the buttons TP1 and SW11, the image of the voltmeter reading at TP1 will be projected on one of the screens 50. If it is desired to simulate the introduction of a proper signal at this point, the buttons TP1, SW9 and SW10 will be depressed and the wave form of the proper signal will be projected on one of the screens 50. Any number of such screens can be incorporated in the equipment to permit the simulation of any desired number of instruments of various types or for the presentation of instructional material. Projection apparatus eminently suited for these requirements is commercially available from Industrial Electronic Engineers, Inc., North Hollywood, Calif., and on page A-15 of Bulletin No. 80-4, dated February 1961, Series 100000.

Adjacent the instructor console 46 in FIG. 1, there are depicted a replace counter 58, a test counter 60, and an elapsed time counter 62, from which the instructor can determine the proficiency of a student. The more rapidly a student overcomes a malfunction and the fewer tests and replacements he employs, the higher will be his score.

Figure 3:
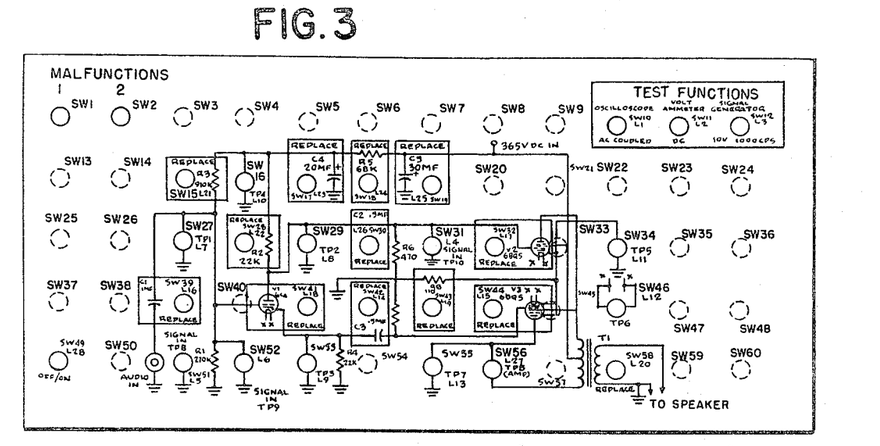
FIG. 3 is a plan view of a template bearing a diagram of an audio amplifier.
Figure 4A:
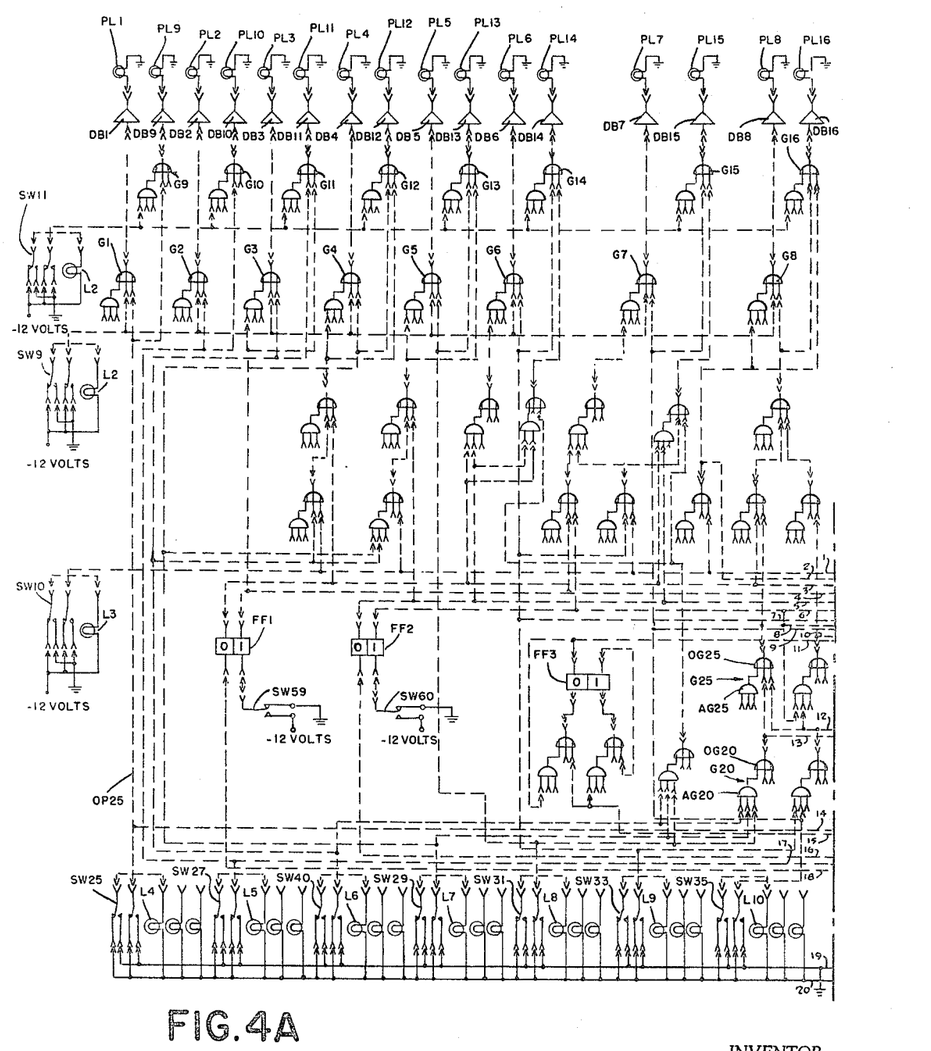
FIGS. 4A and 4B constitute a circuit diagram of the logic where the trainer is equipped with one or more plug boards corresponding to the receiver simulated by the template shown in FIG. 2.
Figure 4B:
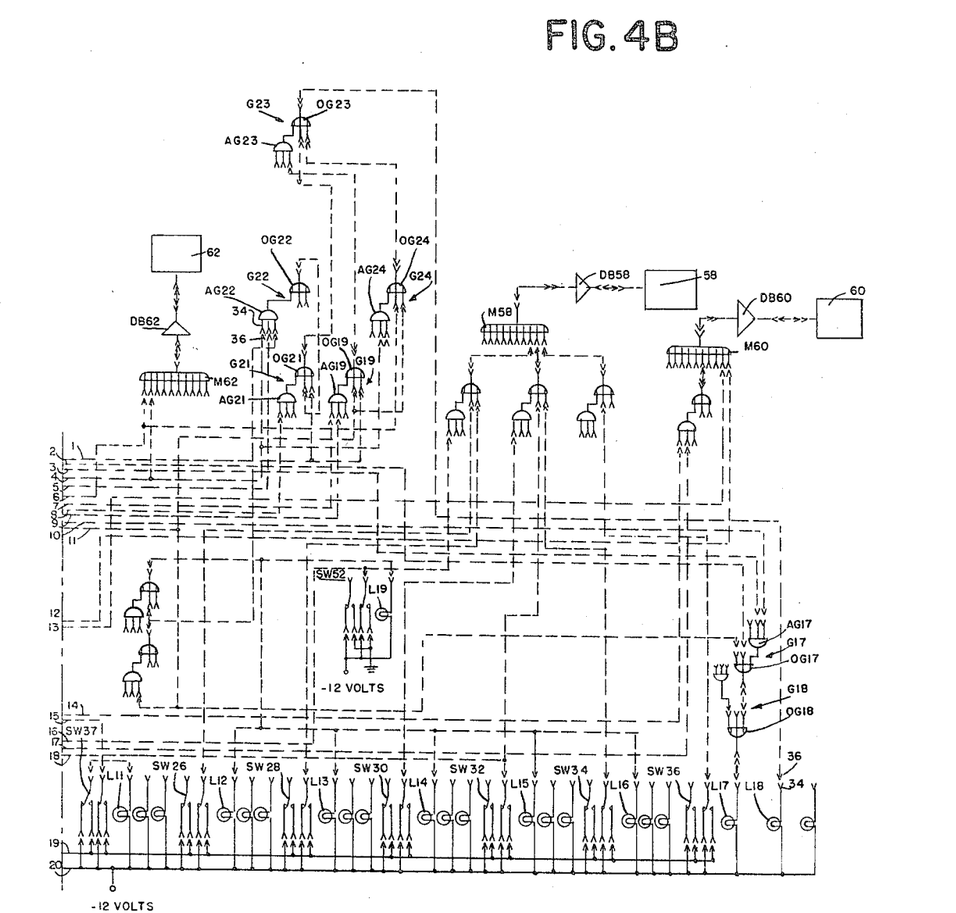
Figure 5A:
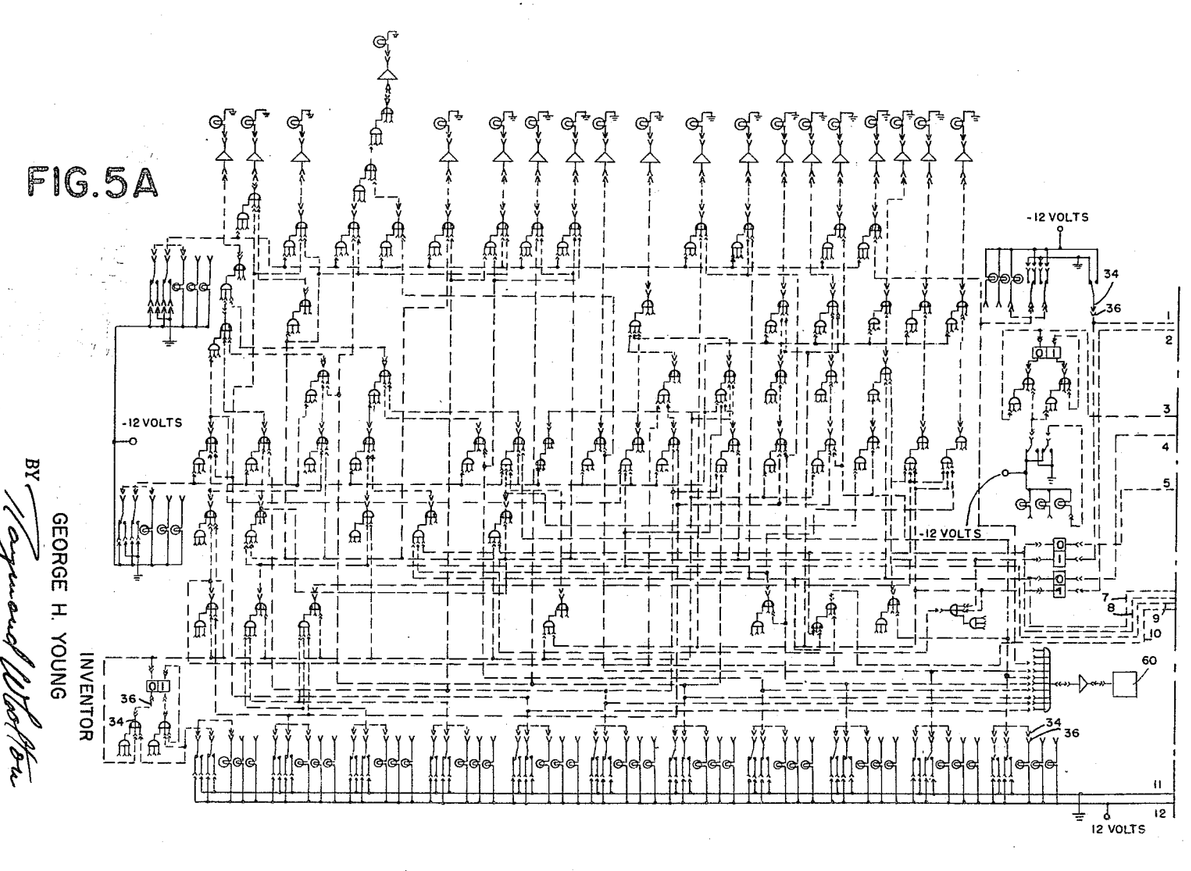
FIGS. 5A and 5B constitute a circuit diagram of the logic where the trainer is equipped with one or more plug boards corresponding to the amplifier simulated by the template shown in FIG. 3.
Figure 5B:
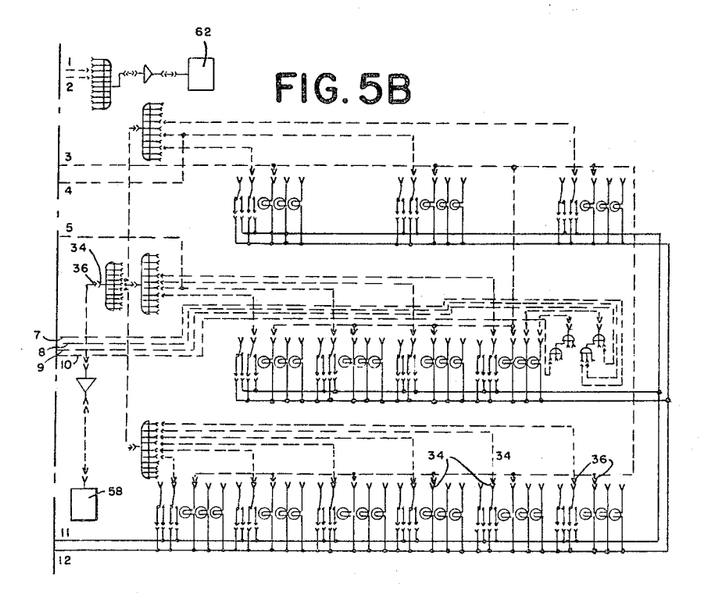
Figures 6, 7, 8, 9, 10, 11, 12:
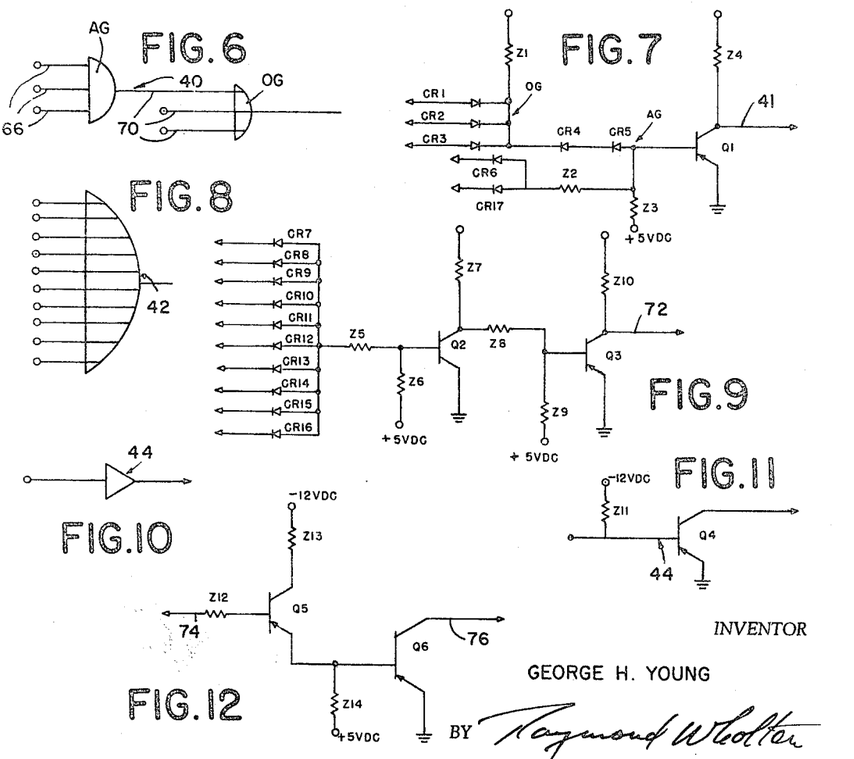
FIG. 6 is a symbolic representation of a gating circuit of the type utilized in the present invention.
FIG. 7 is a circuit diagram of the gating circuit symbolized by FIG. 6.
FIG. 8 is a symbolic representation of a mixer circuit of the type utilized in the present invention.
FIG. 9 is a circuit diagram of the mixer circuit symbolized by FIG. 8.
FIG. 10 is a symbolic representation of a driver circuit of the type utilized in the present invention.
FIG. 11 is a circuit diagram of one form of driver circuit symbolized by FIG. 10.
FIG. 12 is a circuit diagram of another form of driver circuit symbolized by FIG. 10.

The circuitry of FIGS. 4A, 4B, 5A and 5B incorporate gate circuits 40 represented by the symbols of FIGS. 6 and 7, mixer circuits 42 symbolized in FIGS. 8 and 9, and driver circuits 44 in accordance with the symbols of FIGS. 10, 11 and 12, interconnected with one another and with the lamps, switches, and other components, by the interchangeable plug board conductors depicted in broken lines, which plug boards will have corresponding templates or overlays, as well as corresponding transparencies for association with the projectors which display the appropriate images on the screens to simulate the test functions. Accordingly, where the system to be studied is to be changed from the radio receiver of FIGS. 2, 4A and 4B to an amplifier as represented in FIGS. 3, 5A and 5B, the instructor will substitute the template of FIG. 3 for that of FIG. 2, plug boards 38 wired to correspond with the broken line circuitry of FIGS. 5A and 5B for those wired to correspond with the broken line circuitry of FIGS. 4A and 4B, and transparencies to correspond with the signal representations appropriate to the amplifier in lieu of the transparencies pertaining to the radio receiver signal characteristics.

As symbolized in FIG. 6, each gating unit or logic gate 40 includes an AND gate AG having a plurality of inputs 66 driving one input of an OR gate OG having a plurality of inputs 70. The AND gate is shown in FIG. 7 as including the diodes CR1, CR2, CR3 and the resistor Z1, whose output is connected to the OR gate comprising the diodes CR4, CR5, CR6, CR17 and resistors Z2 and Z3. The output of the OR gate is connected to a transistor Q1 whose collector is connected to a resistor Z4 and an output lead 41. Before the transistor Q1 is turned on, the output terminal 41 is supplied from a potential near −12 volts D.C., at which time current may be drawn from an external load connected to the output terminal through a resistor Z4 to the −12 volts D.C. supply. After the transistor Q1 is switched on, its output potential is near ground, at which time current may be supplied to an external load connected at the output terminal 41 through a circuit including the collector, emitter and ground connection. The transistor Q1 is turned on by a potential at its base which is negative with respect to the emitter. This condition will occur when the input terminal of either of the diodes CR6 or CR17 is switched from ground potential to a negative potential closing these diodes, or when the output of the AND gate AG is switched from a potential near ground to a negative potential, closing diodes CR4 and CR5. The output of the AND gate AG will become negative only when all of its inputs are negative, since, if any one of these inputs is at ground potential, the corresponding diode CR1, CR2 or CR3 will be closed, conducting current through the resistor Z1 to the −12 volt D.C. supply, and holding the output of the AND gate AG near ground.

The mixer circuit 42 of FIG. 8 is shown as having ten inputs, which lead to diodes CR7, CR8, CR9, CR10, CR11, CR12, CR13, CR14, CR15 and CR16 as depicted in FIG. 9, having their outputs connected in parallel through a resistor Z5 to +5 volts D.C. through a resistor Z6, and to the base of a transistor Q2 whose emitter is connected to ground and whose collector is connected to −12 volts D.C. through a resistor Z7 and to the base of a transistor Q3 through a resistor Z8. The base of the transistor Q3 is also connected to +5 volts D.C. through a resistor Z9. The emitter of the transistor Q3 is connected to ground and its collector is connected through a resistor Z10 to −12 volts D.C. and to an output lead 72.

With all of the ten input terminals depicted in FIG. 9 at or near ground potential, current flows from the +5 volt D.C. supply through resistors Z5 and Z6 and any of the diodes CR7 through CR16 to any input circuitry externally connected to those terminals. If any one of the ten input terminals is switched negative, the base of transistor Q2 becomes negative with respect to its emitter and current flows in a path from ground to the emitter, the base, resistor Z5 and any of the diodes corresponding to the input terminal which is negative. This turns on the transistor Q2 and its collector switches from a potential near −12 volts to a potential near ground. The base of the transistor Q3, coupled to the collector of the transistor Q2 through a resistor Z8, is thereby switched from a negative to a positive potential with respect to the emitter of the transistor Q3 and the transistor Q3 is turned off. The collector of the transistor Q3 thus switches from a potential near ground to a potential near −12 volts D.C. In this condition current will be drawn through resistor Z10 to the −12 volt D.C. supply from an external load connected to the output terminal 72, whereas with the transistor Q3 turned on current will be supplied from ground through the emitter and collector to an external load at terminal 72.

The driver circuit 44 of FIG. 10 may assume the form depicted in FIG. 11 involving resistor Z11 and transistor Q4, or that shown in FIG. 12 incorporating resistors Z11, Z12, Z13 and transistor Q4.

When the input 74 of the driver circuit of FIG. 12 is at or near ground potential, current flows from the +5 volt D.C. supply through a resistor Z14 to the emitter of a transistor Q5, to its collector, through a resistor Z13 and to the −12 volt D.C. supply and also to the base of the transistor Q5, to a resistor Z12, and to the input terminal 74.

When the terminal 74 is at or near ground potential the positive voltage drop from the emitter to the base of the transistor Q5 maintains the base of the transistor Q6 positive with respect to its emitter which is at ground potential. Thus the transistor Q6 is turned off and no current flows from its collector to a load which may be connected to its output terminal 76.

With the application of a negative signal to the input terminal 74, the base and emitter of the transistor Q5 and the base of transistor Q6 also become negative, and the potential at the base of the transistor Q6 will be negative with respect to its emitter, turning the transistor Q6 on and allowing current to flow from ground through its emitter, and its collector, to an external load connected to the output terminal 76.

When the equipment is to be put in use to study the radio receiver represented by FIGS. 2, 4A and 4B, the actuator indicator button designated SW37 will be depressed to energize the circuits. This will produce illumination of the lamps L11, L12, L13, L14, L15, L16, L18 and L19, as will be evident by tracing the current paths, indicating operating conditions at each of these points. From FIG. 4B it will be observed that both lamps L17 and L18 are associated with SW36 at the speaker station, the lamp L18 being of one color, such as green, to indicate proper system operating conditions, and the lamp 17 having a contrasting color, such as red, to indicate faulty system operating conditions.

Referring to FIG. 4B and the conditions for illuminating the lamp L18, it is seen that there are three inputs to the OR gate OG23 of gating unit G23. If any of these three inputs has a value of −12 volts, the output of the OR gate OG23 will be at ground, allowing the illumination of the lamp L18 to occur. The three inputs can be considered as representing three separate operating conditions, the first of which is represented by the OR gate OG24, which will indicate that no malfunctions are present in the system.

The three inputs to the OR gate OG24 are: the output of the "1" side of the flip-flop FF1 which is at ground when malfunction "1" has not been introduced into the system; the "1" side of flip-flop FF2 which is at ground when malfunction "2" has not been introduced into the system; and the output of the "0" side of flip-flop FF3 which is at ground when the ON-OFF switch SW37 is in the "ON" position. Thus, all three inputs to the OR gate OG24 are at ground potential causing the output of the OR gate OG24 to be at −12 volts and causing lamp L18 to be illuminated.

The instructor might then operate the switch SW59 located on either the main panel, or, if desired, on the instructor console, to introduce a malfunction, which, conforming to the circuitry of FIGS. 4A and 4B will represent a faulty local oscillator. Operation of the switch SW59 places flip-flop FF1 in the "1" state, making its input to the OR gate OG24 assume a value of −12 volts. The output of the OR gate OG24 changes from −12 volts to ground, extinguishing the lamp L18.

The inputs to the OR gate OG17, which is the OR gate preceding the red lamp L17, are provided by the ON-OFF switch controlled flip-flop FF3, the signal generator switch SW10 and the AND gate AG17. When the malfunction "1" was introduced into the system, the "0" side of the flip-flop FF1 changed from −12 volts to ground and the output of AND gate AG17 assumed ground potential also. With all three inputs to the OR gate OG17 at ground potential, the output becomes −12 volts and the output of the OR gate OG18 changes from −12 volts to ground, causing the lamp L17 to become illuminated. The lamp L17 will remain illuminated until the ON-OFF switch SW37 is moved to its OFF position or until the switch SW10 is actuated to introduce a signal into the system.

Operation of the switch SW59 places malfunction "1" into the system and through the mixer M62 and driver DB62 energizes the elapsed time counter 62 which will operate continuously while the malfunction remains in the system.

Assuming that the student is a novice, he would be apt to operate switches SW25 and SW9 to project an image on the oscilloscope screen 50 to ascertain the character of the signal supplied to the input of the RF amplifier. Operation of these switches will connect the conductors OP25 and OP9 to ground, so that the gating unit G1 will have both of its wired inputs connected to ground, producing a −12 volt D.C. output to its driver DB1 to illuminate projection lamp PL1 which illuminates the particular transparency with which it is associated to project the appropriate image on one of the screens 50; at the same time, the test counter 60 will be operated through the mixer M60 and driver DB60.

The student might then depress the buttons actuating switches SW25 and SW11 to obtain a picture on one of the screens 50 depicting a voltmeter reading at the input of the RF amplifier. Operation of these switches will energize the projection lamp PL9 by way of gating unit G9 and driver DB9 to produce an image depicting a voltmeter indication on one of the screens 50. This operation will also energize the circuit of the test counter 60 to increase its indication. In a similar fashion, actuation of the switch SW27 associated with the test point TP2 together with switch SW9 will produce a simulated oscilloscope projection, on one of the screens 50, of the signal existing at the mixer input, by energizing the projection lamp PL2 through the gating unit G2 and the driver DB2, and at the same time the test counter 60 would be actuated again. Simultaneous operation of the switches SW27 and SW11 will illuminate projection lamp PL10 through gating unit G10 and driver DB10 to simulate the appropriate voltmeter reading on one of the screens 50, and again the test counter 60 will be advanced.

Should the student close switch SW40 at test point TP3 and the switch SW9, the projection lamp PL8 will be energized through the gating unit G8 and driver DB8 to project the image of a faulty signal form on one of the screens 50, indicating to the student that a malfunction exists in the local oscillator, and again actuating the test counter 60. Actuation of the switches SW40 and SW11 under these same conditions will illuminate projection lamp PL16 through gating unit G16 and driver DB16 to depict an improper voltmeter indication on one of the screens 50, and again actuating the test counter 60.

If at this time the student decides to insert a signal at the test point TP3 corresponding to the desired output of the local oscillator, he will actuate switches SW40 and SW10. Referring to FIG. 4B, the inputs to the OR gate OG21 are from the test points TP3 and TP4, and from the test point TP5 from the OR gate OG20 through the AND gate AG21; the output of the "1" side of the flip-flop FF1, the output of the "0" side of the flip-flop FF2, and the ON condition from the OR gate OG22. The output from the OR gate OG22 is at ground, since all three inputs to the AND gate AG22 are at −12 volts. The output of the AND gate AG20 is at ground, since depression of the actuator for switch SW40 caused the output lead from the switch associated with test point TP3 to change to ground. Thus, the OR gate OG20 output is −12 volts and the OR gate OG25 output is at ground. The signal generator assumed similar ground conditions when the switch SW10 for operating the signal generator was actuated, with the result that all three inputs to the OR gate OG21 are at ground. The output of the OR gate OG21 accordingly has a value of −12 volts and the lamp L18 is illuminated.

The lamp L17 was extinguished by actuation of the switch SW10 associated with the signal generator. The input to the OR gate OG17 from the switch SW10, changed from ground to −12 volts making the output of the OR gate OG17 ground and the output of OR gate OG18 −12 volts, which extinguished the lamp L17.

Having located the malfunction, the student should actuate the switch SW52 to simulate replacement of the local oscillator, causing the flip-flop FF1 to assume its "0" condition, causing elapsed time counter 62 to stop, extinguishing lamp L17, illuminating lamp L18 and actuating the replace counter 58.

The instructor will then compute a grade or score for the student, based upon the indications on the elapsed time counter 62, the replace counter 58 and the test counter 60.

It is believed that those skilled in the art will comprehend the manner in which the various possible procedures will be effected from the circuit diagrams of FIGS. 4A and 4B when considered with the panel arrangement and template of FIG. 2.

By analogy, the operation of the equipment depicted in FIGS. 3, 5A and 5B will be apparent to those skilled in the art. In these figures, the template portrays an amplifier circuit with its principal components. In this case the test points have been designated by the letter T and the switches by the letter S to avoid confusion. Otherwise, the designations are similar to those of FIGS. 2, 4A and 4B. The malfunction switching for the amplifier is accomplished at the instructor panel and the switch actuators for the oscilloscope, volt-ammeter and signal generator are also exposed by the template. The manipulation of the equipment will be substantially the same as described with reference to the preceding figures and the manner of scoring similar.

The invention should not be limited to the equipment described, but should be defined by the scope of the appended claims.

I claim:
1. A trainer comprising a panel, a plurality of switch actuators and visually changeable indicators carried by said panel; a changeable template overlying all of said actuators and indicators and containing openings registering with certain of said actuators and indicators, said template bearing a portrayal of an operating system and bearing indicia identifying said actuators and indicators with respect to components and functions of said system; electric switches and lamps associated with said actuators and indicators and having terminals; a plurality of gating units having circuits adapted for selective connection with said terminals; a plurality of simulated test instruments associated with said panel to indicate selectively the conditions prevailing at any of a plurality of locations in said system, certain of said actuators serving to select a particular location in said system whose condition is to be indicated, means for selecting any of said instruments to produce an indication of said condition; and readily changeable plug board means providing circuitry interconnecting certain of said circuits with certain of said terminals in correspondence with the operating system portrayed by said template.

2. A trainer according to claim 1 including switches connected by said circuitry with said gating units controlling the operation of said gating units.

3. A trainer according to claim 1 including switching means connected by said circuitry for modifying the operation of certain of said gating units to simulate a malfunction in the portrayed operating system.

4. A trainer according to claim 1 wherein each gating unit comprises an AND gate and an OR gate.

5. A trainer according to claim 4 wherein each AND gate has a plurality of input terminals.

6. A trainer according to claim 4 wherein each OR gate has a plurality of input terminals.

7. A trainer according to claim 1 including means for detachably mounting said template and plug board means to facilitate their replacement.

8. A trainer according to claim 1 including scoring means connected with said circuitry indicating proficiency of a user.

9. A trainer according to claim 8 wherein said scoring means includes a plurality of counters.

10. A trainer according to claim 8 wherein said scoring means includes an elapsed time indicator.

11. A trainer according to claim 8 wherein said scoring means includes an indicator of the number of tests performed by a user.

12. A trainer according to claim 8 wherein said scoring means includes an indicator of the number of corrective measures effected by a user.

13. A trainer according to claim 1 wherein said simulated test instruments are connected by said circuitry with certain of said gating units to represent simulated conditions existing in the portrayed operating system.

14. A trainer according to claim 13 wherein said template portrays a test point for said operating system.

15. A trainer according to claim 1 wherein each of said simulated test instruments includes screen and projector means.

16. A trainer according to claim 1 wherein each of said simulated test instruments includes a screen, a projector, a plurality of transparencies, and means controlled by said gating units selectively projecting said transparencies on said screen.

17. A trainer according to claim 13 wherein said template portrays a plurality of test points for said operating system.

18. A trainer according to claim 13 wherein said template portrays a component of said operating system and said panel includes an actuator for simulating replacement of said component to overcome a malfunction caused by said component.

References Cited by the Examiner

UNITED STATES PATENTS

| | | | |
|---|---|---|---|
| 2,917,834 | 12/1959 | Butler et al. | 35—9.1 X |
| 3,058,663 | 10/1962 | Barnard | 38—13 X |
| 3,061,945 | 11/1962 | Hawkins | 35—13 |
| 3,137,815 | 6/1964 | Hershey | 35—19.1 |
| 3,146,533 | 9/1964 | Carmody et al. | 35—10 |
| 3,152,405 | 10/1964 | Halisky et al. | 35—19.1 |

EUGENE R. CAPOZIO, *Primary Examiner.*

JEROME SCHNALL, *Examiner.*

S. M. BENDER, W. W. NIELSEN, *Assistant Examiners.*